United States Patent
Wakabayashi et al.

(10) Patent No.: US 12,172,305 B2
(45) Date of Patent: Dec. 24, 2024

(54) TRANSFER ROBOT

(71) Applicant: Sinfonia Technology Co., Ltd., Tokyo (JP)

(72) Inventors: Hiroki Wakabayashi, Tokyo (JP); Yasumichi Mieno, Tokyo (JP); Takeshi Yabe, Tokyo (JP); Manabu Funato, Tokyo (JP)

(73) Assignee: Sinfonia Technology Co., Ltd., Tokyo (JP)

( * ) Notice: Subject to any disclaimer, the term of this patent is extended or adjusted under 35 U.S.C. 154(b) by 45 days.

(21) Appl. No.: 18/102,042

(22) Filed: Jan. 26, 2023

(65) Prior Publication Data
US 2023/0241764 A1    Aug. 3, 2023

(30) Foreign Application Priority Data

Jan. 31, 2022   (JP) .................. 2022-012531

(51) Int. Cl.
  *B25J 9/04*    (2006.01)
  *B25J 9/12*    (2006.01)
  *B25J 11/00*   (2006.01)

(52) U.S. Cl.
  CPC .............. *B25J 9/042* (2013.01); *B25J 9/126* (2013.01); *B25J 11/005* (2013.01)

(58) Field of Classification Search
  None
  See application file for complete search history.

(56) References Cited

U.S. PATENT DOCUMENTS

| 5,894,760 A | * | 4/1999 | Caveney | ........... H01L 21/67196 |
| | | | | 74/89.34 |
| 7,578,649 B2 | * | 8/2009 | Caveney | .................. B25J 9/042 |
| | | | | 414/744.1 |

FOREIGN PATENT DOCUMENTS

JP   2007038360 A   2/2007

* cited by examiner

*Primary Examiner* — Michael S Lowe
(74) *Attorney, Agent, or Firm* — Kilpatrick Townsend & Stockton LLP

(57) ABSTRACT

An arm unit of a transfer robot includes an R-axis motor configured to relatively rotate a second arm with respect to a first arm. The R-axis motor is fixed to the first arm so as to protrude to below an arm axis holding portion of the first arm with an output shaft thereof facing upward. The output shaft is configured to penetrate the first arm from below. The output shaft is fixed to the second arm by a shaft fixing portion.

3 Claims, 6 Drawing Sheets

TRANSFER ROBOT

CROSS-REFERENCE TO RELATED APPLICATION

This application is based upon and claims the benefit of priority from Japanese Patent Application No. 2022-012531, filed on Jan. 31, 2022, the entire contents of which are incorporated herein by reference.

TECHNICAL FIELD

The present disclosure relates to a technique of a transfer robot having a hand portion for transferring a workpiece.

BACKGROUND

Patent Document 1 describes a transfer robot that includes an articulated arm unit. By controlling the relative positions of arms of the arm unit by means of motors, the transfer robot can change the position of a hand portion for transferring a workpiece, thereby transferring the workpiece. Further, in the transfer robot described in Patent Document 1, the motors for rotating the arms are accommodated in the joints that connect the arms.

PRIOR ART DOCUMENTS

Patent Documents

Patent Document 1: Japanese Patent Application Publication No. 2007-38360

In a transfer robot, if the height direction size of an arm unit increases, the operating range of a hand portion may be limited in some cases. For example, as the height direction size of the arm unit increases, the height direction position of the hand portion increases relative to the base, which limits the operating range of the hand portion.

SUMMARY

The present disclosure provides a transfer robot capable of reducing the limitation on an operating range of a hand portion for transferring a workpiece.

The transfer robot according to the present disclosure includes an articulated arm unit configured to change a position of a hand portion for transferring a workpiece, and a base part. The arm unit includes a first arm horizontally rotatably supported with respect to the base part by a first joint located on one end side of the first arm, a second arm located above the first arm and horizontally rotatably supported with respect to the first arm by a second joint located on the other end side of the first arm, and a rotary motor configured to rotate the second arm by the second joint. The rotary motor is fixed to the first arm so as to protrude to below the second joint with an output shaft thereof facing upward. The output shaft is configured to penetrate the first arm from below and is fixed to the second arm. The second arm is rotated horizontally with respect to the first arm by the second joint in response to rotation of the output shaft.

In the above configuration, the rotary motor for horizontally rotating the second arm with respect to the first arm by the second joint is fixed to the first arm below the second joint with the output shaft thereof facing upward. The output shaft of the rotary motor is configured to penetrate the first arm from below and is fixed to the second arm. Thus, as compared with the case where the rotary motor is accommodated in the second joint that connects the first arm and the second arm, it is possible to suppress an increase in the height direction dimension of the first arm regardless of the size of the rotary motor. As a result, it is possible to suppress an increase in the height direction dimension of the arm unit, and it is possible to reduce the limitation on the operating range of the hand portion.

The base part includes a fixed base and an elevating base connected to the first arm by the first joint and configured to be raised and lowered from the fixed base in a height direction. As a result, the elevating stroke, which is the height direction range of the operating range of the hand portion, can be expanded to a desired value.

If the dimension of the first arm from a rotation center of the first joint to a rotation center of the second joint is assumed to be L, the base part is positioned inside a range of radius L based on the rotation center of the first joint in the horizontal direction. When the hand portion is located at the lowest position in the height direction by the elevating base, the rotary motor does not interfere with an upper end of the fixed base. As a result, it is possible to reduce the limitation on the operating range of the hand portion while securing a clearance between the first arm and the fixed base.

The arm unit includes an arm shaft portion extending downward from one end side of the second arm, a shaft holding portion located on the other end side of the first arm and having a recess into which the arm shaft portion is inserted, and an arm bearing configured to horizontally rotatably hold the arm shaft portion in the shaft holding portion. The arm shaft portion, the shaft holding portion, and the arm bearing constitute the second joint. The rotary motor is detachably fixed to the first arm on a lower side of the shaft holding portion. Thus, the rotary motor can be removed from the arm unit without releasing the connection between the first arm and the second arm. As a result, it is possible to improve the maintainability of the rotary motor in the transfer robot.

According to the present disclosure in some embodiments, it is possible to provide a transfer robot capable of reducing the limitation on an operating range of a hand portion for transferring a workpiece.

BRIEF DESCRIPTION OF DRAWINGS

The accompanying drawings, which are incorporated in and constitute a part of the specification, illustrate embodiments of the present disclosure.

DETAILED DESCRIPTION

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

FIRST EMBODIMENT

A transfer system according to the present embodiment will be described with reference to the drawings. The transfer system includes a transfer robot and a control device that controls the driving of the transfer robot. The transfer system is a device that transfers a wafer, which is a workpiece, by the transfer robot.

Figure 1:
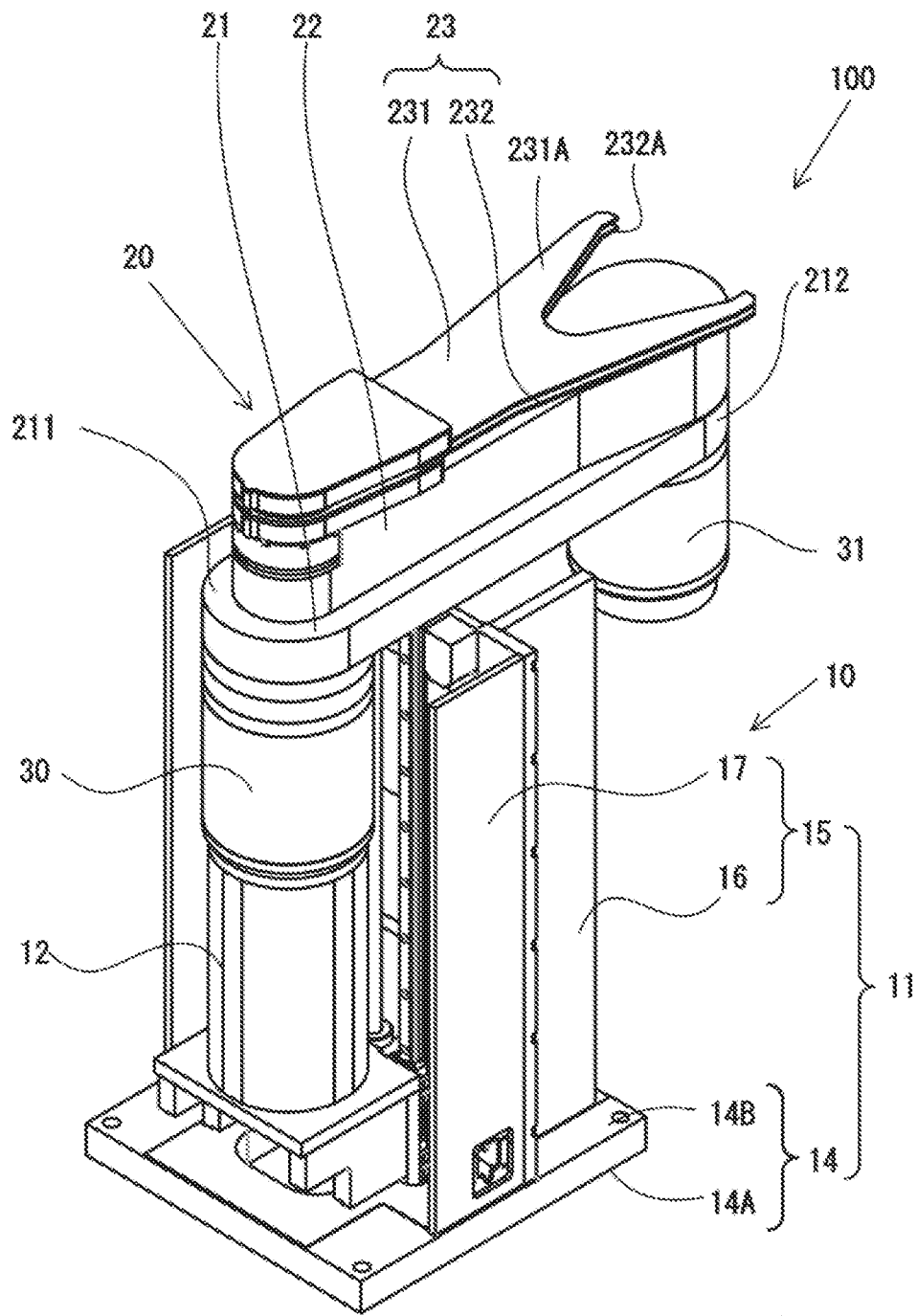
FIG. 1 is a perspective view of a transfer robot.
Figure 2:
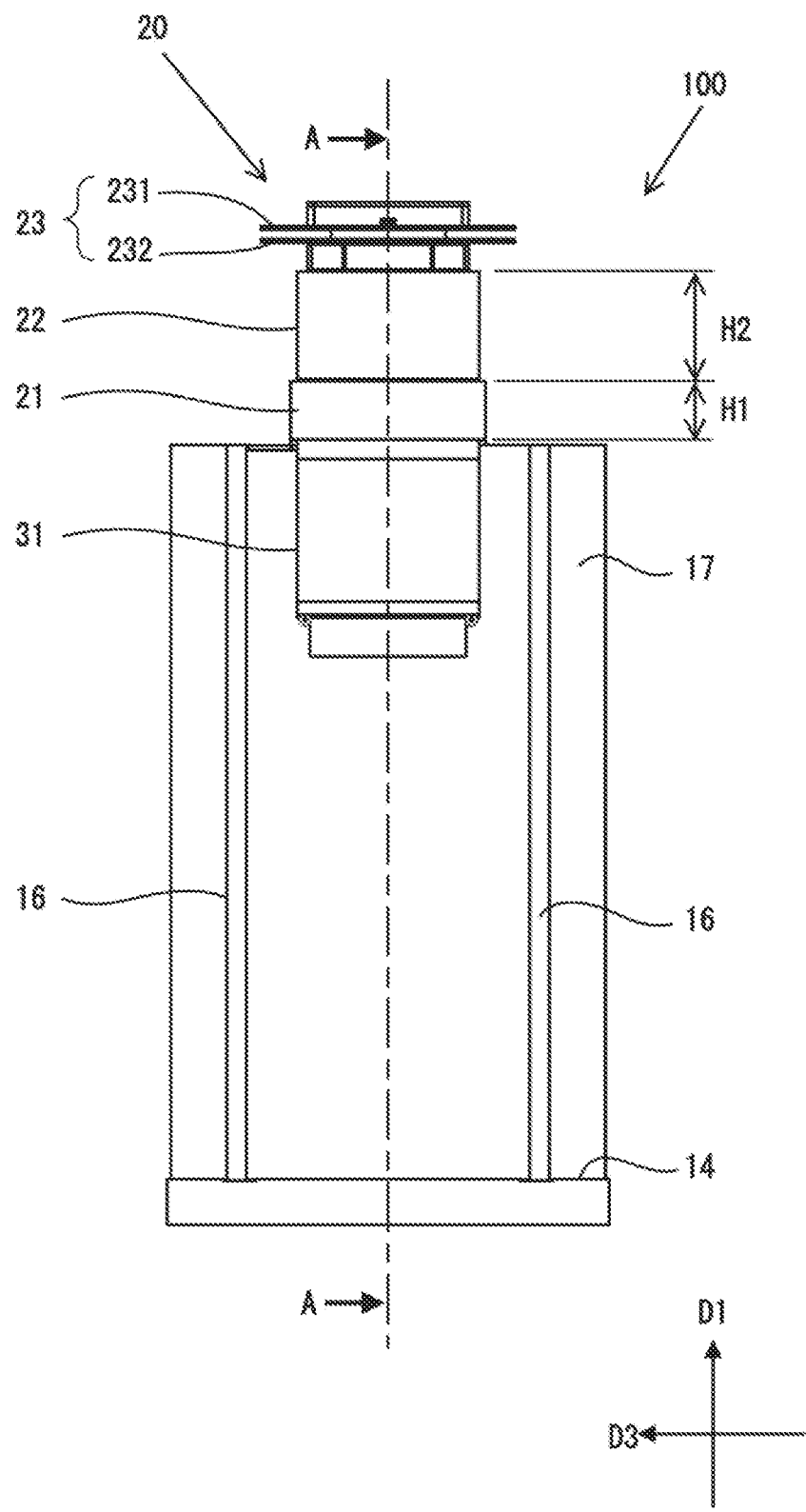
FIG. 2 is a front view of the transfer robot.
Figure 3:
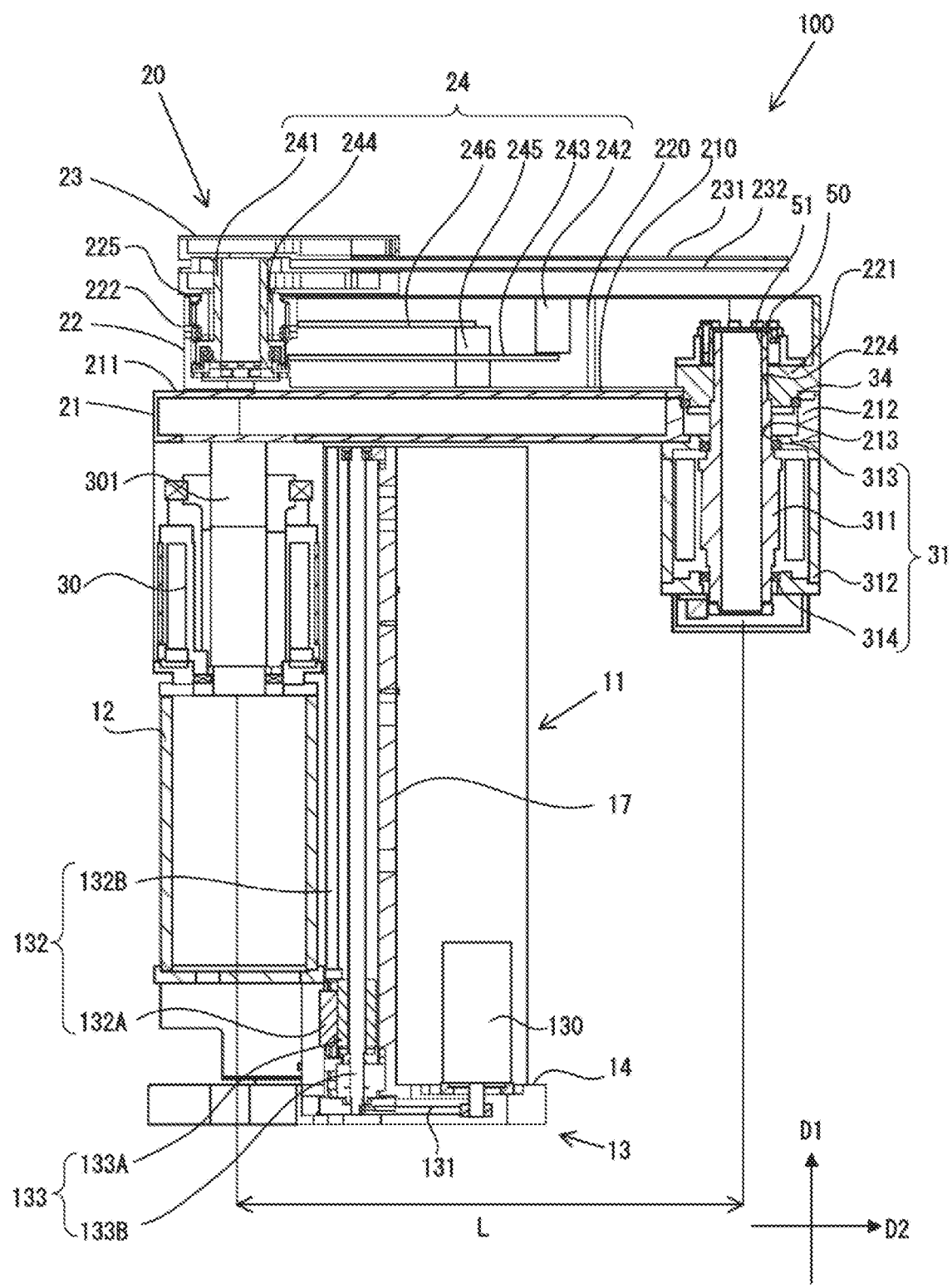
FIG. 3 is a cross-sectional view taken along line A-A in FIG. 2.

FIGS. 1, 2 and 3 show the transfer robot 100 in a posture in which no wafer is transferred, more specifically, in its home position. The transfer robot 100 includes a base part 10 and an arm unit 20. The transfer robot 100 is a device that changes the position of a hand portion (to be described later) within a predetermined operating range by driving the arm unit 20.

In the transfer robot 100, the direction parallel to the mounting surface on which the base part 10 is mounted is referred to as horizontal direction. In the transfer robot 100, the vertical direction is referred to as height direction D1. Of the horizontal direction, the direction in which the arm unit 20 of the transfer robot 100 extends at the home position is referred to as extension direction D2, and the direction intersecting the extension direction D2 is referred to as width direction D3. In other words, the extension direction D2 and the width direction D3 are also horizontal directions that intersect each other.

The base part 10 includes a fixed base 11, an elevating base 12, and an elevating driver 13 (FIG. 3). The fixed base 11 is composed of a pedestal 14 and a vertical column 15 extending from the pedestal 14 in the height direction D1. The pedestal 14 is a member for fixing the transfer robot 100 to a mounting surface at a predetermined position (e.g., a wafer transfer chamber to be described later). The pedestal 14 is a member having a rectangular shape in a plan view and having a bottom surface 14A and a top surface 14B located on the opposite side of the bottom surface 14A. The pedestal 14 is fixed to the mounting surface by, for example, bolts.

The vertical column 15 is composed of a pair of first column portions 16 and second column portions 17. The positions of the first column portions 16 and the second column portion 17 of the vertical column 15 are determined so as not to interfere with the arm unit 20 when the arm unit 20 rotates and moves up and down within the operating range. The first column portions 16 are plate-shaped members, and are arranged side by side with respect to the pedestal 14 in the width direction D3. Specifically, as shown in FIG. 2, the first column portions 16 extend from the pedestal 14 while facing each other in the width direction D3. The second column portion 17 is a portion extending from the pedestal 14 on the left side of the first column portions 16 in the extension direction D2. The second column portion 17 has a central wall facing in the extension direction D2 and a pair of side walls extending from both ends of the central portion. The second column portion 17 is a member formed into a U-shape in a plan view by the central wall and the side walls.

The elevating base 12 is supported so that it can be elevated in the height direction D1 with respect to the fixed base 11 by the elevating driver 13. The arm unit 20 is connected to the upper portion of the elevating base 12. FIG. 3 is a sectional view taken along line A-A in FIG. 2. As shown in FIG. 3, the elevating driver 13 includes a Z-axis motor 130, a Z-axis belt 131, a linear guide 132, and a ball screw 133.

In the fixed base 11, a rail portion 132B constituting the linear guide 132 and a ball screw shaft portion 133B constituting the ball screw 133 are arranged along the height direction D1 on the second column portion 17. The linear block 132A constituting the linear guide 132 is guided by the rail portion 132B and threadedly coupled to a ball screw nut portion 133A via the elevating base 12. The Z-axis motor 130 is attached to the pedestal 14 of the fixed base 11 with its output shaft facing downward. The output shaft of the Z-axis motor 130 and the ball screw shaft portion 133B are connected via the Z-axis belt 131, which is an endless belt. The rotation of the output shaft of the Z-axis motor 130 is converted into the rotation of the ball screw shaft portion 133B by the Z-axis belt 131. The Z-axis motor 130 may be attached to the fixed base 11 with the output shaft facing upward. Also in this case, the output shaft of the Z-axis motor 130 may be connected to the ball screw shaft portion 133B via the Z-axis belt 131.

The rotation of the output shaft of the Z-axis motor 130 rotates the ball screw shaft portion 133B to move the ball screw nut portion 133A up and down. As the ball screw nut portion 133A moves up and down, the linear block 132A is moved up and down while being guided by the rail portion 132B, and the elevating base 12 is moved up and down in the height direction D1.

The arm unit 20 is connected to the upper portion of the elevating base 12. The arm unit 20 includes a first arm 21, a second arm 22, a hand arm 23, a driver 24, a T-axis motor 30, and an R-axis motor 31. The arm unit 20 rotates the first arm 21 horizontally with respect to the base part 10 in the direction in which the output shaft of the T-axis motor 30 rotates (hereinafter referred to as T-axis rotation direction). The arm unit 20 rotates the second arm 22 horizontally with respect to the first arm 21 in the direction in which the output shaft of the R-axis motor 31 rotates (hereinafter referred to as R-axis rotation direction). The arm unit 20 rotates the hand arm 23 horizontally with respect to the second arm 22 in the direction in which pulleys 241 and 244 (described later) of the driver 24 rotate (hereinafter referred to as H-axis rotation direction).

Next, the detailed configuration of the arm unit 20 will be described. The T-axis motor 30 is a motor that rotates the first arm 21 of the arm unit 20 in the horizontal direction (T-axis rotation direction). As shown in FIG. 3, the T-axis motor 30 is fixed to the top portion of the elevating base 12 with the output shaft 301 facing upward in the height direction D1. In the present embodiment, the T-axis motor 30 is an AC motor. Alternatively, the T-axis motor 30 may be a DC motor.

The first arm 21 is an elongated member that includes a T-axis holding portion 211 located on one end side, an arm shaft holding portion 212 located on the other end side, and an extension portion 210 extending between the T-axis holding portion 211 and the arm shaft holding portion 212. The first arm 21 is fixed to the output shaft 301 of the T-axis motor 30 by the T-axis holding portion 211 and connected to the second arm 22 by the arm shaft holding portion 212. The arm shaft holding portion 212 is a portion having a circular recess in a plan view, and has an opening 213 penetrating in the height direction D1 at the center of the recess. The inner diameter of the opening 213 is larger than the diameter of the output shaft of the R-axis motor 31, which will be described later, so that the output shaft of the R-axis motor 31 can pass through the opening 213.

The second arm 22 is an elongated member that includes an arm shaft portion 221 located on one end side, a pulley holding portion 222 located on the other end side, and an extension portion 220 extending between the arm shaft portion 221 and the pulley holding portion 222. The extension portion 220 has a hollow shape and has a space in which the driver 24 is accommodated. The arm shaft portion 221 is a substantially cylindrical portion that extends downward in the height direction D1 from one end side of the extension portion 220. The arm shaft portion 221 has a diameter which is set so that the arm shaft portion 221 can be inserted into the recess of the arm shaft holding portion 212 of the first arm 21. An opening 224 penetrating in the height direction D1 is formed at the center of the arm shaft portion 221. The inner diameter of the opening 224 is larger than the diameter of the output shaft of the R-axis motor 31. The pulley holding portion 222 has an opening 225 penetrating upward. This opening 225 communicates with the space of the extension portion 220.

The arm shaft portion 221 of the second arm 22 is rotatably held and supported within the arm shaft holding portion 212 of the first arm 21. Specifically, the arm shaft portion 221 is held and supported by the arm shaft holding portion 212 via the arm bearing 34 positioned between the outer circumference of the arm shaft portion 221 and the inner circumference of the recess of the arm shaft holding portion 212. Accordingly, even when the R-axis motor 31 is removed from the first arm 21, the second arm 22 is connected to the first arm 21 so as to be rotatable in the horizontal direction (R-axis rotation direction).

In this embodiment, as shown in FIG. 2, the dimension H1 of the first arm 21 in the height direction D1 is smaller than the dimension H2 of the second arm 22 in the height direction D1. This makes it possible to increase the ratio of the dimension H2 of the second arm 22 having the driver 24 arranged therein to the dimension of the arm unit 20 in the height direction.

The R-axis motor 31 is fixed to the lower surface of the arm shaft holding portion 212 of the first arm 21. The R-axis motor 31 includes an output shaft 311, a case 312 that rotatably holds and supports the output shaft 311, and motor-side bearings 313 and 314. The R-axis motor 31 is attached to the lower surface of the arm shaft holding portion 212 with the output shaft 311 thereof facing upward in the height direction D1. Specifically, in the R-axis motor 31, the upper surface of the case 312 is fixed to the lower surface of the arm shaft holding portion 212 by bolts while the output shaft 311 passes through the opening 213 of the arm shaft holding portion 212. Although the R-axis motor 31 is an AC motor, it may be a DC motor. In the present embodiment, the R-axis motor 31 is an example of the rotary motor.

The case 312 accommodates a rotor that generates a magnetic field for rotating the output shaft 311 and a rotary encoder which is a position detector. In the present embodiment, the output shaft 311 has a hollow shape with both ends opened in the direction in which the output shaft 311 extends, and is rotatably held and supported by the case 312 via the motor-side bearings 313 and 314 arranged in the height direction.

The portion of the output shaft 311 of the R-axis motor 31 that extends upward through the first arm 21 is fixed to the second arm 22 by a shaft fixing portion 50 inside the second arm 22. The shaft fixing portion 50 is a member that fixes the output shaft 311 to the second arm 22 by fastening the output shaft 311 in the radial direction of the output shaft 311. Specifically, the shaft fixing portion 50 has a tapered fastening hole 51 whose inner diameter gradually decreases upward in the height direction D1. The shaft fixing portion 50 is fastened to the second arm 22 by bolts inserted around the fastening hole 51 from above while the output shaft 311 passing through the first arm 21 is inserted into the fastening hole 51, whereby the output shaft 311 is radially fastened by the inner peripheral surface of the fastening hole 51.

The second arm 22 is connected to the hand arm 23 at the pulley holding portion 222 on the other end side. In the present embodiment, the hand arm 23 has an upper hand portion 231 and a lower hand portion 232 arranged in the height direction D1. The hand portions 231 and 232 have U-shaped mounting plates 231A and 232A, respectively, and can mount a wafer on the mounting plates 231A and 232A, respectively.

The hand portions 231 and 232 hold and support the wafer mounted on the mounting plates 231A and 232A, respectively, by a vacuum suction method. Each of the hand portions 231 and 232 is not limited to having the mounting plate 231A or 232A as long as it has a shape capable of transferring a wafer. For example, each of the hand portions 231 and 232 may be configured to hold and support a wafer by a mechanical chuck method.

The driver 24 arranged in the second arm 22 includes an upper pulley 241 that changes the position of the upper hand portion 231 with respect to the second arm 22 in the horizontal direction (i.e., the H1-axis rotation direction), an upper motor 242, and an H1-axis belt 243 that connects the upper motor 242 and the upper pulley 241. The driver 24 further includes a lower pulley 244 that changes the position of the lower hand portion 232 with respect to the second arm 22 in the horizontal direction (i.e., the H2-axis rotation direction), a lower motor 245, and an H2-axis belt 246 that connects the lower motor 245 and the lower pulley 244.

If the dimension in the extension direction D2 from the output shaft 301, which is the rotation center of the T-axis motor 30, to the output shaft 311, which is the rotation center of the R-axis motor 31, is assumed to be L, the base part 10 is located inside the operating range of the radius L in the horizontal direction with the output shaft 301 of the T-axis motor 30 as a reference. In other words, even when the first arm 21 is rotated in the T-axis rotation direction, the base part 10 of the transfer robot 100 is positioned so as not to interfere with the R-axis motor 31. Further, when the first arm 21 is located at the lowest position in the height direction by the elevating base 12, the lower end of the first arm 21 is positioned above the upper end of the fixed base 11. In the present embodiment, the "lowest position in the height direction" of the first arm 21 is the position in the height direction of the first arm 21 at the home position.

In the present embodiment, the T-axis holding portion 211 of the first arm 21 and the output shaft 301 of the T-axis motor 30 are an example of a first joint. The arm shaft holding portion 212 of the first arm 21 and the arm shaft portion 221 of the second arm 22 are an example of a second joint.

Figure 4:
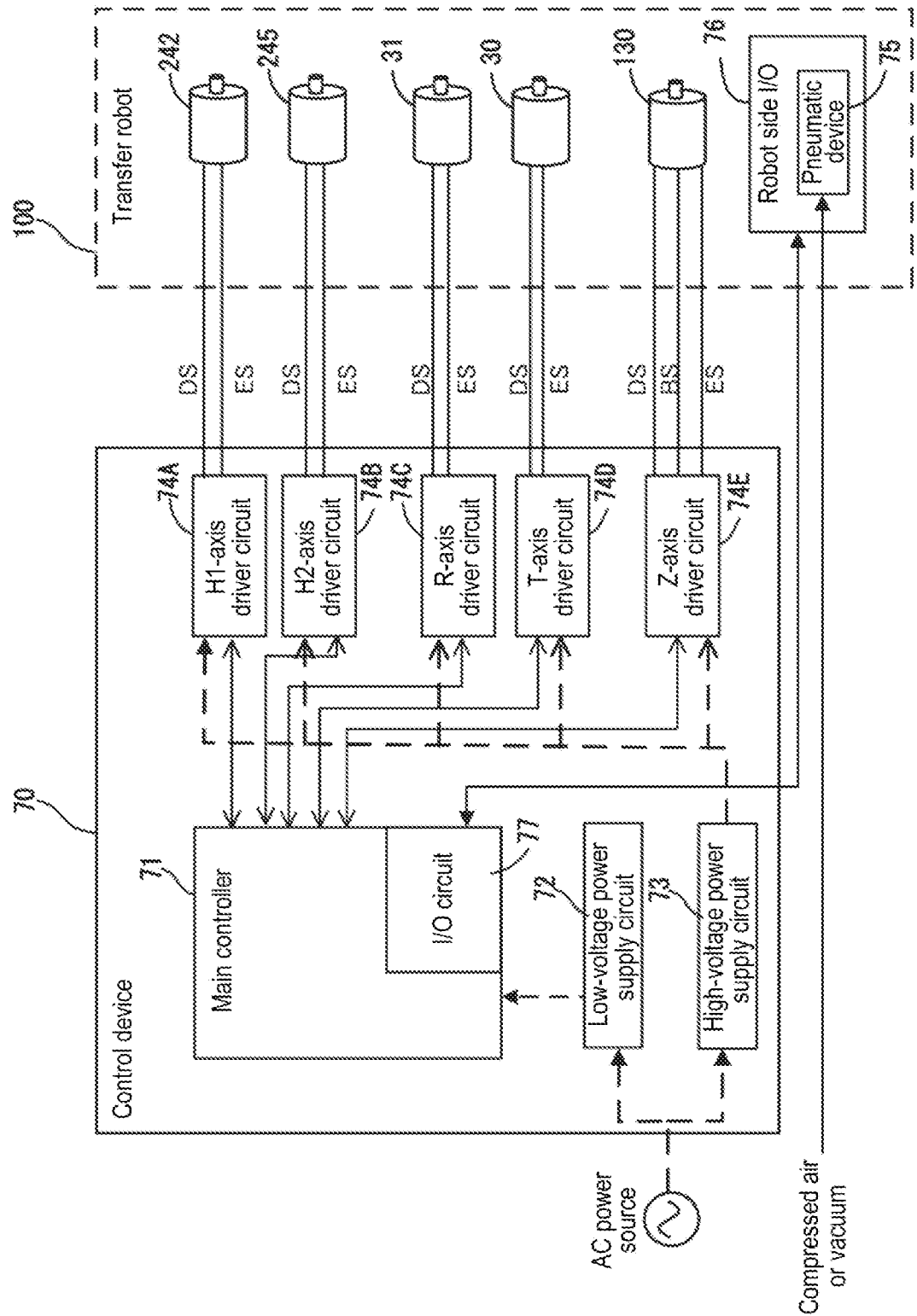
FIG. 4 is a block diagram of a transfer system.

Next, the electrical configuration of the transfer robot 100 will be described with reference to FIG. 4. As shown in FIG. 4, the control device 70 is a device that controls the driving of the motors 30, 31, 130, 242 and 245 of the transfer robot 100, and supplies electric power to each part of the transfer robot 100. The control device 70 includes a main controller 71, a low-voltage power supply circuit 72, a high-voltage power supply circuit 73, and driver circuits 74A, 74B, 74C, 74D and 74E. In FIG. 4, a circuit through which electric power flows is indicated by a broken line.

The main controller 71 includes a memory for storing programs and an arithmetic circuit for executing the programs. The main controller 71 is connected to the driver circuits 74A to 74E, respectively, and outputs drive signals for driving the respective motors to the driver circuits 74A to 74E.

The low-voltage power supply circuit 72 supplies the main controller 71 with electric power for driving the main controller 71. The low-voltage power supply circuit 72 is a well-known converter circuit which converts an AC voltage supplied from an AC power supply into a DC voltage and supplies the DC voltage to the main controller 71.

The high-voltage power supply circuit 73 supplies electric power for driving the motors 30, 31, 130, 242 and 245 to the driver circuits 74A to 74E. The high-voltage power supply circuit 73 is a well-known converter circuit which converts an AC voltage supplied from an AC power supply into a DC voltage and supplies the DC voltage to each of the driver circuits 74A to 74E. In the present embodiment, each driver circuit 74A to 74E generates an AC drive signal DS for driving the motor from the DC voltage.

The driver circuits 74A to 74E are connected to the motors 242, 245, 31, 30 and 130 of the transfer robot 100, respectively. Specifically, the H1-axis driver circuit 74A is connected to the upper motor 242 by a wiring for outputting the drive signal DS and a wiring through which an encoder signal ES from an encoder circuit of the motor flows. The H1-axis driver circuit 74A controls rotation of the output shaft of the upper motor 242 by outputting, to the upper motor 242, a control signal from the main controller 71 and a drive signal DS corresponding to the encoder signal ES.

The H2-axis driver circuit 74B is connected to the lower motor 245 by a wiring for outputting a drive signal DS and a wiring through which an encoder signal ES from the encoder circuit flows. The R-axis driver circuit 74C is connected to the R-axis motor 31 by a wiring for outputting a drive signal DS and a wiring through which an encoder signal ES flows. The T-axis driver circuit 74D is connected to the T-axis motor 30 by a wiring for outputting a drive signal DS and a wiring through which an encoder signal ES flows. The Z-axis driver circuit 74E is connected to the Z-axis motor 130 by a wiring for outputting a drive signal DS, a wiring through which an encoder signal ES flows, and a wiring through which a brake signal BS flows.

The transfer robot 100 includes a pneumatic device 75. The pneumatic device 75 controls the pneumatic pressure of each of the hand portions 231 and 232 by an externally supplied compressed air or vacuum when each of the hand portions 231 and 232 holds and supports a wafer by a vacuum suction method. The pneumatic device 75 is connected to a robot side I/O 76 and receives input of control signals via the robot side I/O 76. The main controller 71 is connected to the robot-side I/O 76 of the transfer robot 100 via an I/O circuit 77. When each of the hand portions 231 and 232 holds and supports a wafer by a mechanical chuck method, the pneumatic device 75 controls the pneumatic pressure for driving a mechanical chuck.

Figure 5:
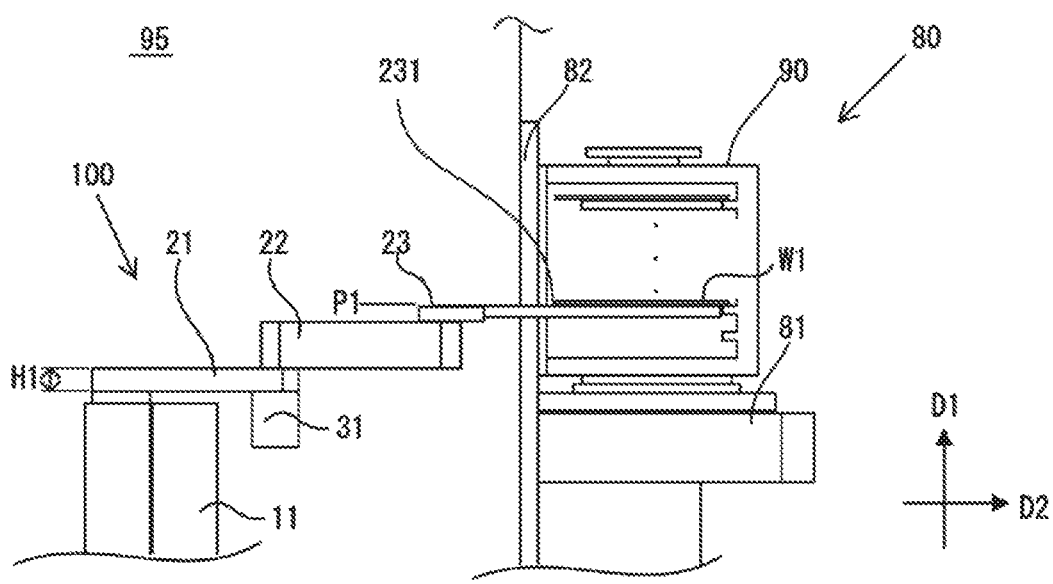
FIG. 5 is a diagram for explaining the operating range of the transfer robot.
Figure 6:
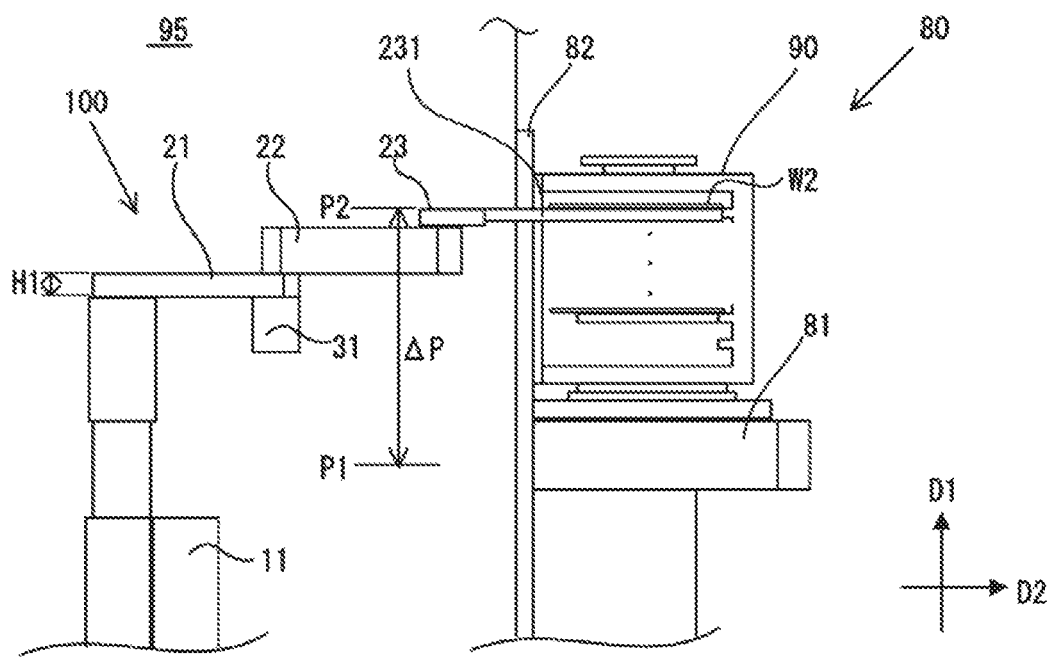
FIG. 6 is a diagram for explaining the operating range of the transfer robot.

Next, the operating range of the transfer robot 100 will be described. FIGS. 5 and 6 show a scene in which the transfer robot 100 takes out a wafer W from a wafer container 90 installed at a load port 80 and transfers the wafer W to a wafer transfer chamber 95. FIG. 5 shows a case where a wafer W1 located at the lowest position in the height direction D1 is taken out from the wafer container 90. FIG. 6 shows a case where a wafer W2 located at the highest position in the height direction D1 is taken out from the wafer container 90. In FIGS. 5 and 6, for the sake of facilitating description, only the upper hand portion 231 of the transfer robot 100 is illustrated, and the illustration of the lower hand portion 232 is omitted.

As shown in FIGS. 5 and 6, the wafer container 90 is disposed on the load port 80. In the wafer container 90, the wafers W are placed one above another at predetermined intervals in the height direction D1. In FIGS. 5 and 6, the illustration of the wafers W accommodated in the wafer container 90 is partially omitted. The load port 80 includes a table 81 for positioning and fixing the wafer container 90 and a port 82 making close contact with the loading/unloading port of the wafer container 90. A wafer transfer chamber 95 is arranged on the opposite side of the loading/unloading port of the load port 80 with a door (not shown) interposed therebetween. A device for subjecting the wafer W taken out from the wafer container 90 to a predetermined process is arranged on the rear surface of the wafer transfer chamber 95. The transfer robot 100 is installed in the wafer transfer chamber 95. Further, the inside of the wafer transfer chamber 95 may be replaced with an inert gas such as nitrogen or argon or a dry air in order to prevent contamination of the wafer. In this case, the pressure inside the wafer transfer chamber 95 is preferably a positive pressure rather than the atmospheric pressure.

As shown in FIG. 5, when the transfer robot 100 takes out the wafer W1 placed at the lowest position of the wafer container 90, the transfer robot 100 controls the position of the elevating base 12 in the height direction D1 so that the upper hand portion 231 of the arm unit 20 is located at the position P1. Then, each of the first arm 21 and the second arm 22 of the arm unit 20 is rotated so that the wafer W1 is placed and held on the upper hand portion 231 of the hand arm 23. In the examples shown in FIGS. 5 and 6, "position P1" is the home position of the transfer robot 100, i.e., the lowest position of the upper hand portion 231 in the height direction.

On the other hand, as shown in FIG. 6, when the transfer robot 100 takes out the wafer W2 placed at the highest position in the wafer container 90, the position of the elevating base 12 is controlled in the height direction D1 so that the upper hand portion 231 of the arm unit 20 is located at the position P2. Then, each of the first arm 21 and the second arm 22 of the arm unit 20 is rotated so that the wafer W2 is placed and held on the upper hand portion 231 of the hand arm 23. In addition, in the examples shown in FIGS. 5 and 6, "position P2" is the highest position of the upper hand portion 231 in the height direction.

In the transfer robot 100 configured as described above, the elevating stroke AP, which is the operating range of the arm unit 20 in the height direction D1, can be controlled between P1 and P2. In this regard, the position P1, which is the lower limit of the elevating stroke AP of the upper hand portion 231, is the lowest position of the upper hand portion 231 in the height direction D1. The position P1 has a larger value as the dimension of the arm unit 20 in the height direction D1 grows larger.

In the present embodiment, the R-axis motor 31 that rotates the second arm 22 with respect to the first arm 21 in the R-axis rotation direction is attached in a state in which the R-axis motor 31 protrudes to below the arm shaft holding portion 212 of the first arm 21. For example, when transferring a heavy wafer or increasing the wafer transfer speed, the size of the R-axis motor 31 is increased according to the required performance such as rated torque or the like. In the transfer robot 100, even if the size of the R-axis motor 31 is large, the dimension H1 of the first arm 21 in the height direction D1 can be reduced as compared to the case where the R-axis motor 31 is accommodated in the joint that connects the first arm 21 and the second arm 22. Thus, even when the position of the upper hand portion 231 in the height direction D1 is lowered to a desired position, it is possible to secure a clearance from the lower surface of the first arm 21 to the upper end of the fixed base 11. As a result, the position of the upper hand portion 231 when the arm unit 20 is located at the lowest position in the height direction D1 can be set to a desired low position, and hence the elevating stroke AP of the hand portion 231 can be increased to a desired value.

The following effects can be obtained according to the present embodiment described above. In the arm unit 20, the R-axis motor 31 that rotates the second arm 22 in the R-axis rotation direction is fixed to the first arm 21 so as to protrude to below the second joint with the output shaft 311 thereof facing upward. In the R-axis motor 31, the output shaft 311 penetrate the first arm 21 from below, and the output shaft 311 is fixed to the second arm 22 by the shaft fixing portion 50, so that the second arm 22 can be rotated with respect to the first arm 21 in the horizontal direction. As a result, even if the size (body size) of the R-axis motor 31 is increased according to the required performance of the motor, it is possible to suppress an increase in the dimension H1 in the height direction of the first arm 21, and hence it is possible to reduce the limitation on the operating range of the arm unit 20.

The base part 10 includes the fixed base 11 and the elevating base 12 which is connected to the first arm 21 and can be raised and lowered from the fixed base 11 in the height direction D1. As a result, the elevating stroke, which is the range in the height direction D1 within the operating range, can be increased to a desired value.

If the dimension in the extension direction D2 from the output shaft 301 of the T-axis motor 30 to the output shaft 311 of the R-axis motor 31 is assumed to be L, the fixed base 11 is located inside the operating range of the radius L in the horizontal direction with the output shaft 301 of the T-axis motor 30 as a reference. When the first arm 21 is located at the lowest position in the height direction D1 by the elevating base 12, the R-axis motor 31 does not interfere with the upper end of the fixed base 11. As a result, while maintaining the clearance between the lower surface of the first arm 21 and the upper end of the fixed base 11, the elevating stroke of each of the hand portions 231 and 232 can be increased.

The arm shaft portion 221 of the second arm 22 is held and supported in the arm shaft holding portion 212 of the first arm 21 so as to be rotatable in the R-axis rotation direction by the arm bearing 34. The R-axis motor 31 is detachably fixed to the lower surface of the arm shaft holding portion 212 of the first arm 21 by bolts. Thus, the R-axis motor 31 can be removed from the arm unit 20 without releasing the connection between the first arm 21 and the second arm 22. As a result, it is possible to improve the maintainability of the R-axis motor 31.

Since the R-axis motor 31 is attached to the outside of the first arm 21, even if the large R-axis motor 31 is attached to the first arm 21 in order to increase the rated torque, the dimension of the first arm 21 in the height direction D1 does not increase. As a result, the transfer robot 100 can increase the torque of the R-axis motor 31 while securing the elevating stroke of each of the hand portions 231 and 232. This makes it possible to transfer a larger wafer.

OTHER EMBODIMENTS

The technique disclosed in this specification is not limited to the above-described embodiment, and may be modified in various forms without departing from the scope of the present disclosure. For example, the following modifications may be made. In the first embodiment described above, the arm unit 20 is a three-joint unit that relatively rotates the arms 21, 22 and 23 in the T-axis rotation direction, the R-axis rotation direction, and the H-axis rotation direction. Alternatively, the arm unit 20 may be a unit having four or more arms and three or more joints. Also in this case, the R-axis motor 31 may be fixed to the lower surface of the first arm 21 connected to the base part 10.

In the first embodiment described above, the hand arm 23 has the upper hand portion 231 and the lower hand portion 232. Alternatively, the hand arm 23 may have only the upper hand portion 231.

In the first embodiment described above, the base part 10 includes the elevating base 12 and the elevating driver 13, and is capable of controlling the position of the arm unit 20 in the height direction D1 to fall within the elevating stroke. Alternatively, the base part 10 may not include the elevating base 12 and the elevating driver 13. In this case, the T-axis motor 30 of the arm unit 20 may be fixed to the fixed base 11.

While certain embodiments have been described, these embodiments have been presented by way of example only, and are not intended to limit the scope of the disclosures. Indeed, the embodiments described herein may be embodied in a variety of other forms. Furthermore, various omissions, substitutions, and changes in the form of the embodiments described herein may be made without departing from the spirit of the disclosures. The accompanying claims and their equivalents are intended to cover such forms or modifications as would fall within the scope and spirit of the disclosures.

EXPLANATION OF REFERENCE NUMERALS

10: base part, 11: fixed base, 12: elevating base, 20: arm unit, 21: first arm, 22: second arm, 23: hand arm, 30: T-axis motor, 31: R-axis motor, 50: shaft fixing portion, 70: control device, 100: transfer robot, 231: upper hand portion, 232: lower hand portion

What is claimed is:

1. A transfer robot comprising:
   an articulated arm unit configured to change a position of a hand portion for transferring a workpiece; and
   a base part,
   wherein the arm unit includes:
      a first arm horizontally rotatably supported with respect to the base part by a first joint located on one end side of the first arm;
      a second arm located above the first arm and horizontally rotatably supported with respect to the first arm by a second joint located on an other end side of the first arm; and
      a rotary motor configured to rotate the second arm by the second joint,
   wherein the rotary motor is fixed to the first arm so as to protrude to below the second joint with an output shaft of the rotary motor facing upward,
   wherein the output shaft is configured to penetrate the first arm from below and is fixed to the second arm,
   wherein the second arm is rotated horizontally with respect to the first arm by the second joint in response to a rotation of the output shaft,
   wherein the second arm includes an arm shaft portion extending downward from one end side of the second arm, wherein the first arm includes a shaft holding portion located on the other end side of the first arm and having a recess into which the arm shaft portion is inserted, wherein the arm unit further includes an arm bearing positioned between the first arm and the second arm to horizontally rotatably hold the arm shaft portion in the shaft holding portion, wherein the arm shaft portion, the shaft holding portion, and the arm bearing constitute the second joint, and wherein the rotary motor is detachably fixed to the first arm on a lower side of the shaft holding portion.

2. The transfer robot of claim 1, wherein the base part includes:

a fixed base; and an elevating base connected to the first arm by the first joint and configured to be raised and lowered from the fixed base in a height direction.

3. The transfer robot of claim 2, wherein if a dimension of the first arm from a rotation center of the first joint to a rotation center of the second joint is assumed to be L, the base part is positioned inside a range of radius L based on the rotation center of the first joint in a horizontal direction, and wherein when the hand portion is located at the lowest position in the height direction by the elevating base, the rotary motor does not interfere with an upper end of the fixed base.

\* \* \* \* \*